March 10, 1970
W. C. BELK ETAL
3,499,519
FRUIT FEEDING APPARATUS
Filed March 15, 1968
3 Sheets-Sheet 1
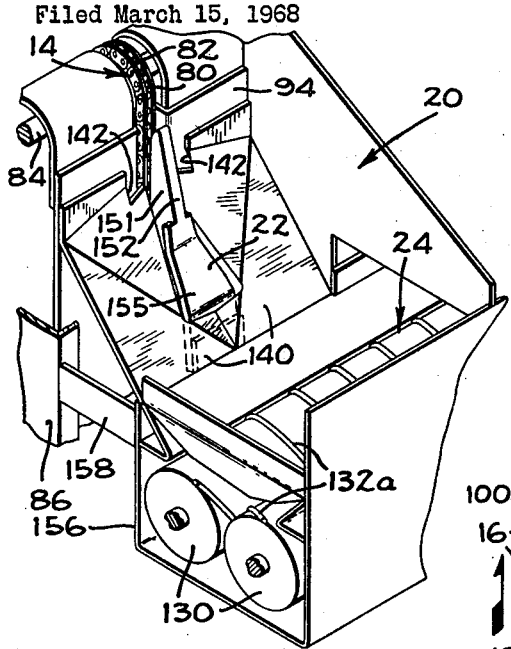
FIG_8
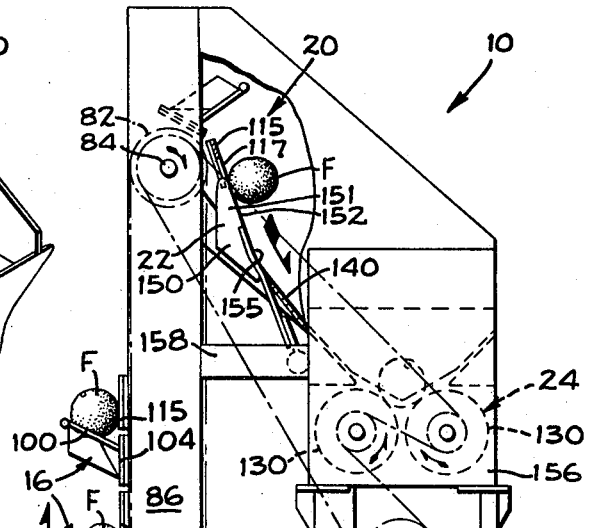
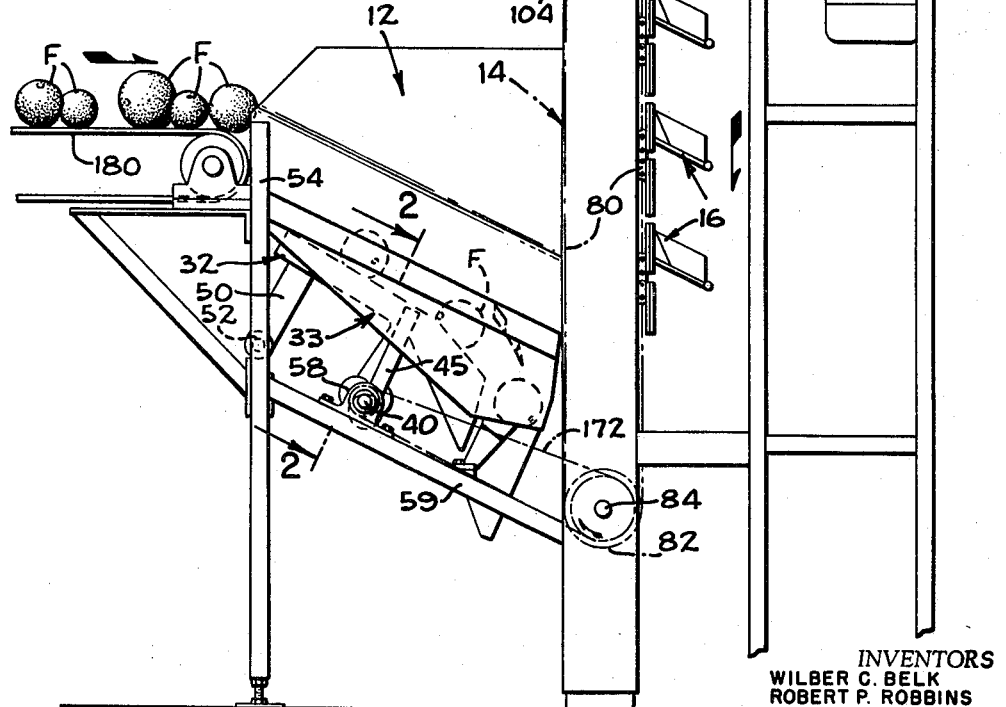
FIG_1
INVENTORS
WILBER C. BELK
ROBERT P. ROBBINS
DONALD C. TOOTHMAN
BY J.W. Anderson
C.C. Tripp
ATTORNEYS

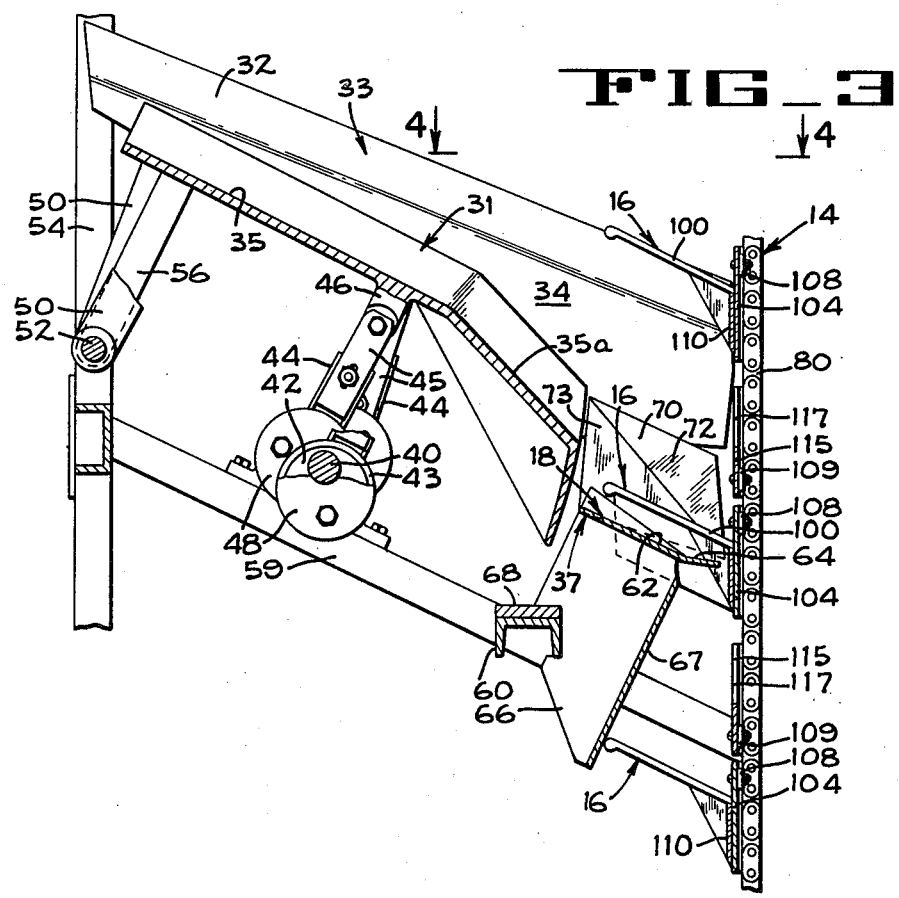
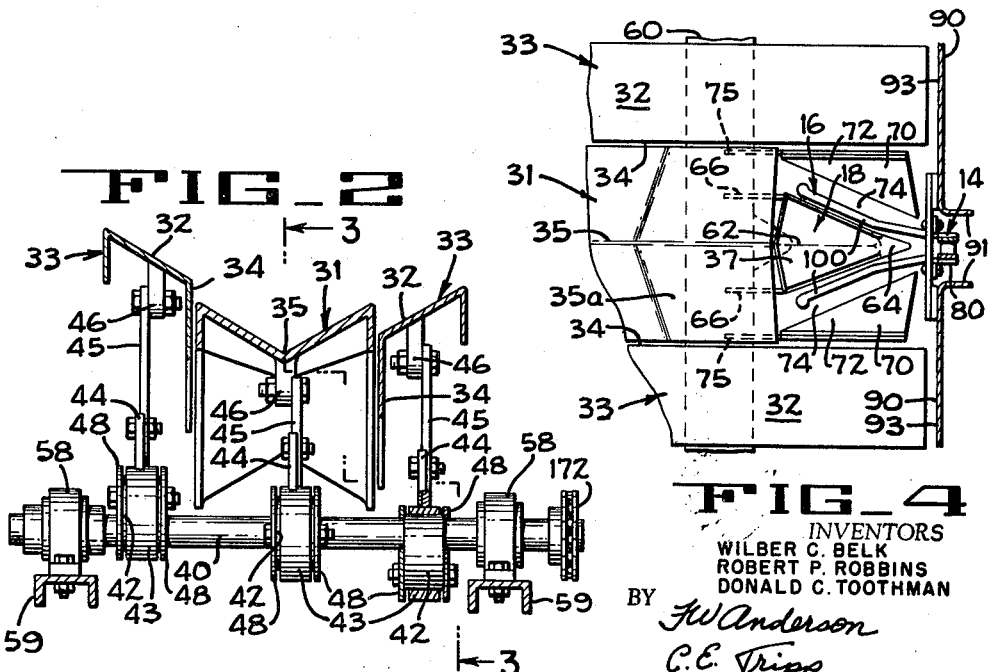

March 10, 1970     W. C. BELK ET AL     3,499,519
FRUIT FEEDING APPARATUS
Filed March 15, 1968     3 Sheets-Sheet 3
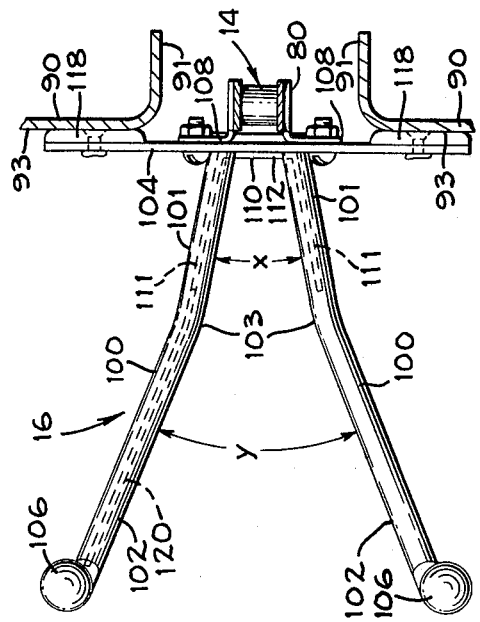
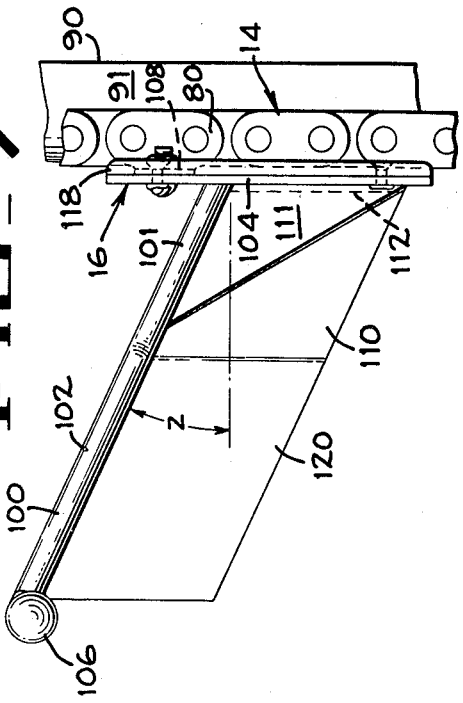
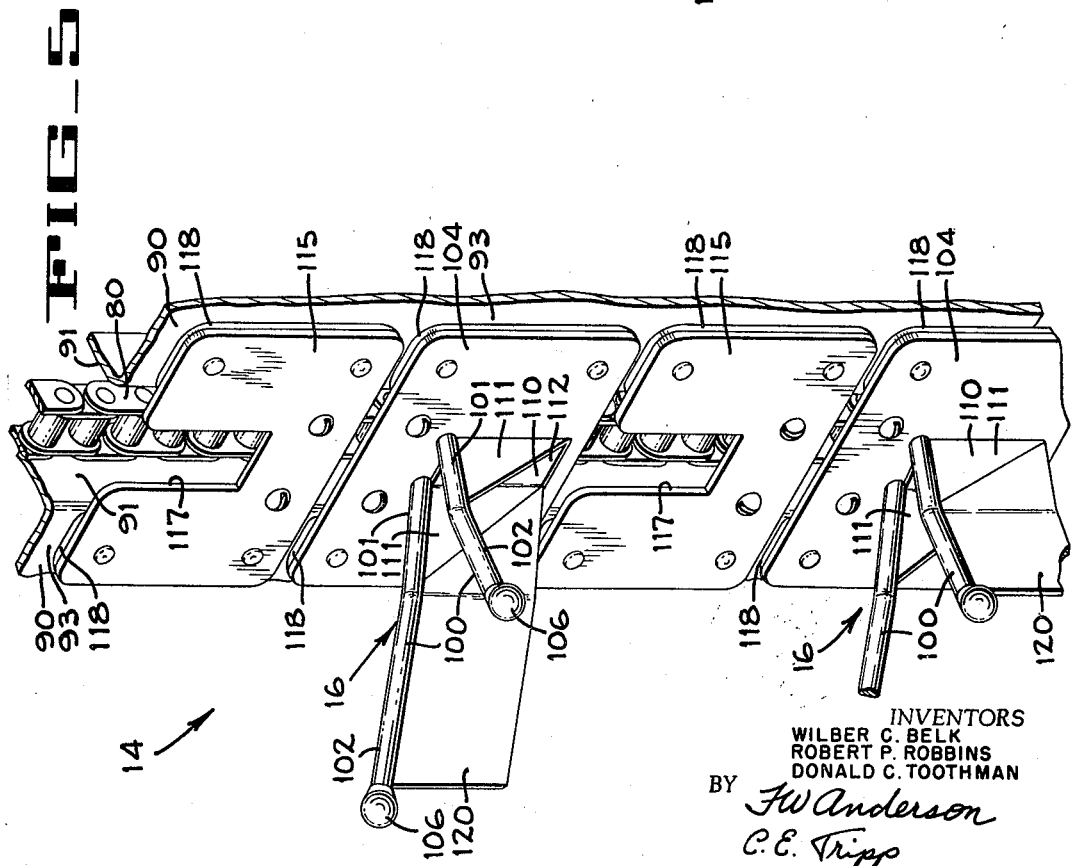
INVENTORS
WILBER C. BELK
ROBERT P. ROBBINS
DONALD C. TOOTHMAN
BY
FW Anderson
C.E. Tripp
ATTORNEYS

United States Patent Office 3,499,519
Patented Mar. 10, 1970

3,499,519
FRUIT FEEDING APPARATUS
Wilber C. Belk, Robert P. Robbins, and Donald C. Toothman, Lakeland, Fla., assignors to FMC Corporation, San Jose, Calif., a corporation of Delaware
Filed Mar. 15, 1968, Ser. No. 713,419
Int. Cl. B65g 47/26
U.S. Cl. 198—30                                    20 Claims

ABSTRACT OF THE DISCLOSURE

A supply of fruit is received in a downwardly inclined, V-shaped hopper having side sections and a central section each reciprocating vertically in out-of-phase relationship to feed the fruit successively to the lowermost end of the hopper where it can be individually picked up upon the lift fingers of a vertical elevator. The elevator comprises a continuously driven endless chain carrying a plurality of uniformly spaced sets of lift fingers, each set including a pair of upwardly inclined and outwardly diverging fingers which will pick up only one fruit at a time and discharge it into a feed conveyor at the top of the elevator structure.

BACKGROUND OF THE INVENTION

Field of the invention

In general, this invention pertains to that field of art concerned with conveying apparatus, and more particularly, it pertains to fruit conveyors wherein the fruit is singulated and vertically lifted from a bulk supply in a hopper.

Description of the prior art

In the fruit processing field it sometimes becomes necessary to singulate fruit from a bulk supply so that the fruit can be fed individually in timed and spaced relationship to a particular type of processing or testing apparatus. It is also frequently necessary to elevate the fruit either during or in conjunction with the singulating process. For example, in feeding citrus fruit such as oranges or grapefruit to a certain type of juice extracting machine, a bulk supply of fruit must be singulated and lifted to a relatively high elevation. Since conditions of limited space usually prevail in commercial fruit processing installations, it is also necessary that the singulation and elevation of the fruit be carried out without using an excessive amount of floor space.

One prior art method of singulating and elevating fruit is the well known shuffle feed device, for example, such as is shown in the patent to Chamberlin 3,088,577. While such conveying structures provide generally good results, they are expensive to build and to maintain. Another disadvantage of this type of equipment is the fact that it requires a considerable amount of space since both the elevation and singulation of the product must be achieved gradually.

Another method of accomplishing the desired objective is through the use of a vertical lift elevator which works directly with a bulk supply of fruit in a hopper. Prior art fruit lifting and singulating conveyors of this type are described in the patents to Coons 2,471,479 and 2,581,634 and have been used for feeding pears. Such devices have been found to be ineffective however, when they are used to singulate and elevate fruit of a generally spherical shape, such as oranges and grapefruit, and this is particularly true where the supply might contain fruit varying over a wide range of diameters.

A still further prior art method of singulating fruit from a bulk supply depends upon the necessity of first arranging the fruit into a single line before feeding it to a continuously moving lift elevator having uniformly spaced flights. A typical example of a machine of this type is the feed mechanism illustrated and described in the patent to McClelland 2,929,488. With this type of handling and conveying system, a problem exists in the initial step of arranging the fruit into a single line, and this problem may be insurmountable where the apparatus must be designed to handle a mixed supply of fruit covering diverse shapes and sizes.

One prior art patent which does describe a method of singulating spherical objects from a bulk supply hopper by a vertical elevator with spaced flights is the patent to Simon 3,000,537. It will readily be seen, however, that the lift structure of this patent is designed to pick up golf balls which are well known to be approximately uniform in size and shape; consequently, the problem of singulating fruit of varying diameters is not presented or solved.

SUMMARY OF THE INVENTION

The apparatus of the present invention comprises an agitating type of feed hopper and a vertical conveyor having specially designed flights which will pick up one, and only one, fruit each time they are passed through the feed portion of the hopper structure. The feed hopper is generally trough-shaped and downwardly inclined and includes vertically reciprocating side sections which are reciprocated in an out-of-phase relationship so that a single fruit can be fed to the lowermost point in the hopper where it can be received upon one of the upwardly moving flights of the conveyor. The flights of the conveyor each comprise a pair of fingers which extend upwardly and outwardly diverge from the vertical plane of the conveyor. The shape and configuration of the fingers is such that only one fruit can be maintained upon them at any one time as long as the fruit has a generally rounded exterior surface, i.e., is somewhat spherical in shape.

A truly significant feature of the apparatus of the present invention is its ability to handle a wide range of fruit diameters. For example, the apparatus has been tested with oranges and grapefruit ranging from one and one-half inches up to six inches in diameter. Even more significantly, the apparatus of the present invention has shown that it can successfully singulate fruit with this range of diameters even when such fruit are mixed in one hopper load. While broadly similar singulating and elevating structures have been used before, not one of such structures is known to be nearly as effective in singulating rounded fruit where non-uniformity of size is encountered to a significant degree.

BRIEF DESCRIPTION OF THE DRAWINGS

FIGURE 1 is a side elevation of the fruit feeding apparatus of the present invention with a portion thereof being broken away and with only a selected few of the flights of the lift conveyor being shown for the purposes of clarity.

FIGURE 2 is an enlarged section through the feed hopper taken along the line 2—2 of FIGURE. 1.

FIGURE 3 is a section taken along the line 3—3 of FIGURE 2.

FIGURE 4 is a section taken along the line 4—4 of FIGURE 3 illustrating in plan the structure of the feed hopper at the fruit pickup point.

FIGURE 5 is an enlarged isometric view illustrating a portion of the conveyor chain and its fruit-lifting flights.

FIGURE 6 is an enlarged plan of one of the conveyor flights shown in FIGURE 5.

FIGURE 7 is a side elevation of the conveyor flight shown in FIGURE 6.

FIGURE 8 is an enlarged isometric detail view particularly showing the fruit discharge station at the top of the lift conveyor with a portion of the frame structure being omitted for the purpose of illustration.

DESCRIPTION OF THE PREFERRED EMBODIMENT

The fruit feeding apparatus 10 of the present invention is designed to handle rounded fruit of broadly spherical shape, which may be supplied in a random mixture of diverse shapes and sizes. The apparatus is particularly designed to operate with citrus fruit, such as oranges or grapefruit, and singulate and elevate the field runs of such fruit although it will be recognized that the apparatus is readily adaptable to handle other fruit products having generally similar characteristics.

The fruit feeding apparatus 10 (FIGURE 1) is seen to generally comprise a feed hopper 12 into which a bulk supply of fruit F is discharged and a vertical lift conveyor 14. The lift conveyor includes a plurality of uniformly spaced flights 16 each of which is designed to pick up a single fruit from a hopper pocket 18 (best shown in FIGURE 4) at the lowermost end of the feed hopper and to carry it vertically over the top of the conveyor structure to a discharge station 20. At the discharge station (FIGURE 8) a stripper bar 22 is properly positioned to aid in stripping the fruit from the conveyor flights, and the fruit is allowed to gravitate into a feed conveyor 24 which is then utilized to feed the fruit singly and in properly spaced relationship to some subsequent fruit processing apparatus.

The feed hopper 12 receives a supply of fruit F and is generally trough-like in shape sloping downwardly toward the lowermost end of the lift conveyor 14. As best shown in the cross-sectional view of FIGURE 2, the primary operating portion of the feed hopper includes a V-shaped and downwardly inclined central section 31 and two side sections 33, with each of the side sections including a flat inwardly inclined face 32 to feed the fruit toward the central section and a vertically extending face 34 closely spaced from the central section. The central section and each of the side sections are independently vertically reciprocated so that fruit in the hopper will be directed into a V-shaped trough 35 extending longitudinally along the center line of the central section and will be permitted to gravitate forwardly to a shallow, V-shaped feed member 37 which is stationarily mounted in the hopper pocket 18 at the lowermost end of the hopper adjacent to the lift conveyor. The trough 35 extending down the center of the hopper is provided with a steeper portion 35a (FIG. 3) at its lower end to better effect the delivery of fruit therefrom into the feed member 37.

The vertical reciprocating movement of the hopper side sections 33 and the hopper central section 31 is accomplished by means of a continuously rotated drive shaft 40. Fixed to the drive shaft at properly spaced intervals are three eccentrically mounted cylindrical blocks 42. Each of the side sections and the central section is connected to one of the eccentrics 42 by a connecting rod arrangement which comprises a collar 43 rotatably received about the cylindrical side face of the eccentric, a short channel 44 welded to the side face of the collar, and a connecting arm 45 adjustably bolted to the channel and to a securing bracket 46 depending from the hopper sections 31 and 33 near the lower central portions thereof. The collars are maintained upon the eccentrics by a pair of flat-faced guide plates 48 which are bolted to the outer faces thereof. It is to be particularly noted that the arrangement of the eccentrics 42 upon the drive shaft 40 (FIG. 3) is such that each of the hopper sections 31 and 33 are reciprocated in an out-of-phase relationship with each other—the arrangement being shown wherein each hopper section is rotatively displaced 120° from the other two sections. Such an out-of-phase drive maintains each of the sections at different elevations as they are reciprocated and prevents the bridging of two or more fruit across the hopper thereby permitting a single fruit to be always directed to the feed member at the lower end of the hopper.

As shown in FIGURE 3, the uppermost ends of each of the hopper side sections 33 are rotatably secured by means of connecting arms 50 to a fixed shaft 52 extending between and being affixed to upright frame members 54 spanning the inlet end of the hopper. The central section 31 is also rotatably secured to the shaft 52 by means of a rotatably mounted connecting rod 56. Consequently, each of the sections 33 and 31 will be pivoted about the shaft 52 and any jams or bridging of fruit in the inlet end of the hopper will be broken. The drive shaft 40 providing the rocking movement for the hopper sections is received in bearing blocks 58 which are mounted upon inclined frame members 59 secured at their upper ends to the upstanding frame members 54 and at their lower ends to the sides of the vertical conveyor structure.

Extending between the side frame members 59 near the lowermost ends thereof is an inverted channel-shaped frame member 60 which serves to mount the stationary feed member 37 at the hopper pocket 18 (FIG. 3). This feed member includes a shallow, V-shaped trough 62 which is downwardly inclined and which ends in an arrow-shaped nose 64 extending almost horizontally to a point directly adjacent to the face of the vertical lift conveyor 14. The feed member is secured to the inverted channel 60 by means of support wings 66 which diverge rearwardly from a nose portion 67 and are welded or otherwise rigidly secured to a flat support member 68 that is bolted to the upper face of the channel. Directing the fruit onto the feed member adjacent to the lift conveyor are a pair of guide members 70 each of which includes a triangularly shaped face 72 sloping inwardly toward the feed member and a vertically extending face 73 which defines a side wall of an opening 74 (FIG. 4) at the hopper pocket through which the flights 16 on the conveyor are arranged to move. The guide members 70 are secured to the support member 68 by connecting straps 75 (FIG. 4).

Due to the continuous reciprocating movement of the hopper side sections 33, it will readily be appreciated that fruit will not be permitted to bridge the space between the vertically extending side faces 34 thereof. Since the side sections will be moving in opposite directions throughout the major portion of their cycle, fruit received on one side of the hopper or the other will be positively forced downwardly to the central conveying trough 35 or to the receiving trough 62 of the feed member 37 where it is centered and can be directly lifted.

The vertical lift conveyor 14 generally comprises an endless chain 80 which is trained about a pair of sprockets 82 that are mounted upon drive shafts 84 extending between and being rotatably received in the upper and lower ends of a pair of channel-shaped side frame members 86. The conveyor chain is arranged to run between the inwardly extending faces 91 of a pair of opposed frame members 90 which also include flat faces 93 that form both the front and rear faces of the vertical frame structure. The conveyor flights 16 which are attached to the conveyor chain are adapted to be carried along the flat faces 93 throughout their vertical lifting movement, as best shown in the detailed view of FIGURE 5.

The conveyor flights 16 are particularly illustrated in FIGURES 5, 6 and 7 and form a very important part of the present invention. The primary functional components of the lifting flights are a pair of spaced fingers 100 which are upwardly inclined (as shown in FIGURE 7) and are outwardly divergent (as shown in FIGURE 6). Each finger includes a relatively short inner section 101, which is welded or otherwise rigidly secured to a flat-faced mounting plate 104, and a relatively long outer section 102. The boundary between the inner section 101 and the outer section 102 is defined by a bend 103 causing the outer sections 102 to diverge from the plate of the conveyor at a wider angle than the inner sections; for example, from the plan view of FIGURE 6 it can be seen that the angle $x$ between the inner sections 101 is approximately half as great as the angle $y$ between the outer sections 102. The upward inclination of the fingers from the horizontal (shown by the angle $z$ in FIGURE 7) forms a fruit receiving pocket between the upper surfaces of the fingers and the conveyor, and in the embodiment of the invention shown this angle can be seen to be approximately the same as the angle $x$ between the inner sections of the fingers. A small sphere 106 is welded to the outermost end of each of the fingers to prevent fruit from becoming impaled or otherwise scarred and scuffed upon the sharp edges of the fingers. It is important to note that the entire surfaces of the spheres lie below the projection of the upper surface of the fingers (FIG. 7) and the projection of the opposed inner faces of the fingers (FIG. 6); this arrangement prevents the spheres from being used to support a fruit and thereby affect the singulating function of the lifting fingers. The finger mounting plates 104 are uniformly spaced throughout the conveyor chain 80 and are secured to the chain by means of mounting brackets 108 which are attached to the opposite sides of a chain link and are bolted to the upper edge of the mounting plates when the mounting plates are received upon the front, or fruit receiving, face of the lift structure. Helping to support the fingers upon their mounting plates are U-shaped support members 110 which include triangularly-shaped support arms 111 underlying the inner sections of the fingers and a flat base section 112 rigidly secured to the center of the mounting plate.

As can be seen in the isometric view of FIGURE 5, each flight 16 is separated from the adjacent flights by a flat plate 115 which is also mounted to the conveyor chain. These backing plates 115 provide a three-point support for the fruit (see FIG. 1) while it is received upon the upper surfaces of the fingers. The plates are rigidly attached to the chain links by L-shaped brackets 109, FIG. 3, similar to the brackets 108 securing the mounting plates 104 to the conveyor chain. The backing plates are seen to be secured to the chain at their lowermost edges directly adjacent to the attachment of the lower finger mounting plate 104; consequently, each finger mounting plate and backing plate combination will move up the face of the vertical conveyor structure and over the top thereof substantially as a single unit. Each backing plate is provided with a central notch 117 at the upper edge thereof for a purpose to be described later. Both the finger mounting plates and the backing plates are provided with wear strips 118 (FIG. 6) riveted to their back faces along the side edge thereof for riding along the flat faces 93 of the conveyor frame structure.

From the illustration of the conveyor flights in FIGURE 5, it can be seen that each flight is additionally provided with a skirt 120 attached to the lower edge of one of the fingers and extending from an abutting position with the outer edge of the support bracket 110 to the outermost end of the finger. It is also to be noted that only one skirt is provided for each conveyor flight and that the skirts are placed in staggered relationship on the conveyor chain; that is to say, with a skirt placed on the left side of the mounting fingers (as shown in full in FIGURE 5) the skirts directly above and below on the adjacent conveyor flights will be on the right side thereof. The purpose of the skirts is to further insure the placing of a single fruit within the hopper pocket 18 in a position to be picked up by the lift fingers 100. As a set of fingers moves upwardly past the feed member 37 with a supported fruit, the fruit received upon one side of the hopper pocket will be prevented from immediately moving to the feed member by the skirt connected to that set of fingers. Bridging of fruit is thereby also prevented in that area below the reciprocating side sections 33 of the hopper since that fruit adjacent one of the guide walls 73 will always be able to move more rapidly into the properly centered position on the feed member than that fruit adjacent the other guide wall.

As can be seen from the plan view of FIGURE 4, the fingers 100 are arranged to move through the openings 74 in the bottom of the hopper closely adjacent to the support wings 66 of the feed member 37 and to pick up the fruit resting thereon and lift it vertically. The support wings 66 act as a V-shaped guide for the fingers to prevent them from becoming ensnared within the hopper pocket structure should there be appreciable side play in the conveyor chain. The shape and spacing of the fingers is such that one, and only one, fruit will be able to rest in the pocket formed by the upper surfaces of the fingers and their associated backing plate 115. The close spacing of the inner sections of the fingers permits very small fruit to be received in a stable manner thereon; however, if two small fruit are positioned above the fingers, the second fruit will be discharged either over the outside edges of the fingers or between the widespread outer sections 102 of the fingers. It is again noted that the outer sections diverge at a wider angle than the inner sections to thereby provide a stable support for a larger fruit. Again, only one large fruit can be supported on the fingers. Even if a very small fruit is positioned upon the inner sections of the fingers, a larger fruit, which is not supported on the backing plate 115, will not be in a stable position on the diverging outer sections 102 and will gravitate through the opening therebetween.

By way of example, an apparatus has been built and successfully tested according to the present description and has been found to successfully singulate field runs of citrus fruit ranging in diameter from one and one-half inches up to six inches. This apparatus will singulate up to 90 fruit/minute. In order to obtain the proper singulation of fruit of the diameters mentioned, the length of the inner sections 101 of the fingers was 1⅝ inches and the length of the outer sections 102 was 2⅝ inches; the angle of upward inclination $z$ (FIG. 7) was 25°; the angle $x$ (FIG. 6) between the inner finger sections was 22°; the angle $y$ (FIG. 6) between the outer finger sections was 45°; and the spacing between the inner ends of the fingers was ¾ inch (center-to-center). The apparatus was found to perform satisfactorily with both the generally spherically shaped oranges and the somewhat more oblate grapefruit and was found to be capable of handling both hard and soft types of citrus fruit.

After the fruit has been picked up by the conveyor flights it is carried up over the top of the conveyor structure (as shown in FIGURE 1) and is deposited at the discharge station 20 into the transversely extending feed conveyor 24 the structure of which is not important to a proper understanding of the present invention. As best shown in FIGURE 8, the feed conveyor 24 may comprise a pair of oppositely rotating rollers 130 having helical feed tracks 132 thereon. The fruit which is received upon the feed conveyor will be in timed and spaced relationship and may be fed to any subsequent processing machinery which has such feeding requirements, such as a juice extractor for example. The fruit is ejected into the feed conveyor as the flights are turned over the top of the lift conveyor structure. The fruit is free to gravitate from the fingers and onto a pair of downwardly inclined guide plates 140 which are rigidly attached to the uppermost edges of the rearwardly extending faces 94 of the conveyor frame structure. The guide plates are provided with notches 142 at their upper edges to permit the passage of the downwardly moving conveyor flights.

The stripper bar 22 is placed directly between the guide plates 140 and close to the face of the conveyor chain 80 to positively eject that small percentage of fruit which may have become wedged between the support fingers 100. The stripper bar includes a generally triangularly-shaped plate 150 which has an upwardly extending nose 151 rounded at its upper edge and closely positioned adjacent to the conveyor chain. The notch 117 in the backing plates 115 allows these plates to pass over the nose of the stripper bar (as seen in FIG. 1) during discharge of the fruit. The rearwardly extending edge 152 of the stripper bar plate 150 extends outwardly and serves to cam the fruit out of the fingers. This edge mounts a curved plate 155 which extends downwardly and outwardly generally adjacent to the guide plates 140 to direct fruit into the feed conveyor 24. It can be seen that a smooth guiding surface is provided across the faces of the guide plates 140 and the face of the stripper bar plate 155 so that the discharged fruit will be gently guided to the feed conveyor. As best shown in FIGURE 8, frame structure 156 mounting the feed conveyor and the outer edges of the guide plates and stripper bar is supported by a pair of frame members 158 which are secured to the side frame members 86 of the vertical conveyor structure.

The drive for the various functioning components of the fruit feeding apparatus is shown in FIGURE 1 and is seen to comprise a motor M which drives the upper lift conveyor sprocket 82 through a drive chain 170. This main drive chain is also connected so as to drive the drive rollers 130 of the feed conveyor 24. A secondary drive chain 172 is powered by the drive shaft 84 that mounts the lowermost lift conveyor sprocket 82 and serves to provide a continuous source of power for the drive shaft 40 which reciprocates the components of the feed hopper (FIG. 3).

Briefly summarizing the operation of the apparatus of the present invention, the fruit F is first brought to the feed hopper 12 (by a feeding conveyor 180, for example) and is dumped into the uppermost end thereof. The side sections 33 and the central section 31 of the hopper reciprocate in out-of-phase relationship and continuously agitate the fruit permitting it to gravitate to the lowermost end of the hopper where it will eventually be received upon the stationary feed member 37 adjacent to the vertical conveyor structure 14. As has been pointed out, the structure of the feed hopper is such that one fruit will always be centered within the shallow pocket 62 of the feed member as long as there is fruit in the hopper, and the lift fingers 100 which are moving past the feed member will pick up this fruit while any fruit received directly thereabove will be caused to fall to the sides or between the outer diverging sections of the lift fingers. The fruit is carried upwardly by the conveyor and over the top of the conveyor structure where it is dumped into the feed conveyor 24. Fruit tending to hang up between the fingers will be stripped off gently at the discharge station by the stripper bar 22.

It can be seen that the present invention provides an apparatus for both singulating and elevating generally spherical products such as fruit which may come in a wide range of diameters and in shapes ranging from the elongated to the oblate. The structure is relatively simple and requires no complex or costly mechanisms to achieve the desired result. The design of the fruit pickup fingers is particularly advantageous in preventing two fruit from being lifted at the same time. It is also appreciated that the structure of the present invention uses a minimum amount of floor space since it primarily comprises a direct vertical lift, and, therefore, it is entirely satisfactory for use in those fruit processing plants where floor space is at a premium.

Although the best mode contemplated for carrying out the present invention has been herein shown and described, it will be apparent that modification and variation may be made.

Having completed a detailed description of the invention so that those skilled in the art could practice the same, we claim:

1. Fruit feeding apparatus comprising a trough-shaped hopper for holding a plurality of fruit, a vertical conveyor having a plurality of spaced flights movable upwardly through a portion of said hopper to pick up said fruit therefrom, and means for successively centering fruit in said hopper in position to be successively received upon adjacent conveyor flights, each of said flights comprising a pair of fruit supporting fingers extending upwardly in outwardly diverging relationship from the vertical plane of said conveyor so as to permit only one fruit to be picked up and to be supported thereon.

2. Fruit feeding apparatus as set forth in claim 1 including a fruit supporting member attached to said conveyor and having a vertically extending flat face portion, said fruit being arranged to be received in the space between said fingers and said face portion of the supporting member.

3. Fruit feeding apparatus as set forth in claim 1 wherein said fingers have spaced inner sections nearest said conveyor outwardly diverging from said conveyor plane at a first angle and outer sections extending from said inner sections in outwardly diverging relationship from said conveyor plane at a second angle, said second angle being substantially greater than said first angle.

4. Fruit feeding apparatus as set forth in claim 3 wherein said outer sections of the fingers are of greater length than said inner sections and wherein said second angle is approximately twice as great as said first angle.

5. Fruit feeding apparatus as set forth in claim 2 wherein the outermost ends of said fingers are provided with rounded surfaces to prevent damage to the fruit in said hopper.

6. Fruit feeding apparatus as set forth in claim 1 including a skirt extending vertically from the lowermost surface of one of the fingers of each conveyor flight with the other finger of each conveyor flight having a free space therebelow whereby fruit adjacent said pickup portion of the hopper will move into position to be received upon a conveyor flight past the unencumbered finger of the preceding upwardly moving flight before moving past the finger having a skirt thereon whereby two fruit will be prevented from bridging across said pickup portion of the hopper in positions where neither fruit can be successfully received upon the fingers of said conveyor flight, said skirts being alternately placed at opposite sides of the conveyor.

7. Fruit feeding apparatus according to claim 1 wherein said hopper is inclined downwardly toward said conveyor and is provided with vertically reciprocable side sections, and means for continuously reciprocating said side sections in out-of-phase relationship so as to aid in feeding fruit singly into the proper position in the hopper to be picked up by said conveyor flights.

8. Fruit feeding apparatus according to claim 1 wherein said hopper is comprised of a trough-shaped central section and a pair of inwardly inclined side sections, each of said hopper sections being downwardly inclined toward said conveyor and being independently mounted for vertical reciprocating movement, a stationary hopper pocket mounted at the lowermost portion of the hopper adjacent the lower edge of said central section of the hopper, said fruit supporting fingers being arranged to move upwardly on either side of said pocket and closely spaced thereto to receive the fruit resting thereon and lift it vertically, and means for continuously reciprocating said central section and side sections of the hopper in out-of-phase relationship so as to feed fruit singly into said pocket in position to be picked up by said fingers.

9. Fruit feeding apparatus according to claim 8 wherein said fingers have spaced inner sections nearest said conveyor outwardly diverging from the vertical plane thereof at a first angle and outer sections extending from said inner finger sections in outwardly diverging relationship from said conveyor plane at a second angle, said second angle being substantially greater than said first angle.

10. Fruit feeding apparatus comprising an endless chain conveyor, means mounting said conveyor vertically for continuous movement through upward and downward runs, a plurality of uniformly spaced flat fruit supporting plates mounted upon said conveyor, a plurality of spaced sets of fruit supporting fingers mounted upon said conveyor with each set comprising a pair of upwardly extending and outwardly diverging fingers capable of supporting only one fruit at a time during the upward run of said conveyor, a trough-shaped and downwardly extending hopper positioned adjacent to the lower end of said conveyor for carrying a supply of fruit, and a hopper pocket at the lowermost end of said hopper for supporting a fruit in position to be picked up upon the upper surfaces of said fingers, said pocket being defined by openings in said hopper structure permitting said fingers to be moved upwardly through said hopper to receive said fruit between the upper surfaces thereof and the flat face of an associated fruit supporting plate.

11. Fruit feeding apparatus according to claim 10 wherein said fingers have spaced inner sections nearest said conveyor outwardly diverging from the plane of said fruit supporting plates at a first angle and outer sections extending from said inner sections in outwardly diverging relationship from said plane at a second angle, said second angle being substantially greater than said first angle.

12. Fruit feeding apparatus according to claim 10 wherein said hopper comprises vertically reciprocal side sections, and means for continuously reciprocating said hopper side sections in out-of-phase relationship to successively feed fruit into the proper centered position upon said hopper pocket for pickup by said conveyor fingers.

13. Fruit feeding apparatus according to claim 10 including means for discharging said fruit at the top of the downward run of said conveyor, said discharging means including a downwardly and outwardly extending stripper bar closely spaced to the surface of said conveyor for gently camming fruit out of said fingers as said fingers pass downwardly about said stripper bar.

14. Fruit feeding apparatus comprising a vertical conveyor, a plurality of sets of fingers arranged upon said conveyor for individually lifting fruit from a hopper carrying a bulk supply of fruit, each of said sets comprising a pair of upwardly inclined, spaced fingers of generally cylindrical configuration, said fingers each having inner sections outwardly diverging from the plane of the conveyor at a first angle and outer sections extending from said inner sections in outwardly diverging relationship at a second angle, said second angle being substantially greater than said first angle, and a plurality of fruit supporting plates secured to said conveyor each having a vertically extending face above an associated set of fingers whereby only one fruit may be supported between the upper surfaces of a set of fingers and its associated supporting plate and lifted out of the hopper.

15. Fruit feeding apparatus according to claim 14 wherein said outer sections of the fingers are of greater length than said inner sections.

16. Fruit feeding apparatus according to claim 15 wherein said second angle is approximately twice as great as said first angle and wherein said first angle is approximately the same as the angle of upward inclination of the fingers with the horizontal.

17. Fruit feeding apparatus comprising a hopper for carrying a supply of fruit and for directing said fruit individually to the spaced flights of a vertical conveyor, said hopper comprising a trough-shaped central section and a pair of inwardly inclined side sections, means mounting each of said hopper sections in a downward inclination and for vertically reciprocating movement, a stationary hopper pocket at the lowermost portion of the hopper adjacent the lower edge of said central section for receiving a fruit in a position to feed said vertical conveyor, said hopper being provided with upwardly extending openings adjacent said hopper pocket for permitting said conveyor flights to be moved upwardly, and means for continuously reciprocating said hopper sections in out-of-phase relationship so as to successively feed properly centered fruit to said pocket in positions to be lifted by successive flights on said conveyor.

18. Fruit feeding apparatus according to claim 17 wherein said hopper side sections comprise flat upper portions inclined toward said central section of the hopper and vertically extending lower portions directly adjacent to said central section, said lower portions extending from the upper end of said hopper to positions directly adjacent to said vertical conveyor.

19. Fruit feeding apparatus according to claim 17 wherein said hopper sections are mounted at their upper ends for pivotal movement with the lower ends of said hopper sections being free for said vertically reciprocating movement.

20. Fruit feeding apparatus according to claim 18 including inwardly inclined, stationary guide plates positioned between said lower portions of the hopper side sections and directly adjacent to said openings by said hopper pocket for directing said fruit into said pocket.

References Cited
UNITED STATES PATENTS 2,235,922    3/1941    Friesenhahn _____ 221—253

EDWARD A. SROKA, Primary Examiner

U.S. Cl. X.R.

221—253